(12) United States Patent
Al-Arifi

(10) Patent No.: US 8,247,342 B2
(45) Date of Patent: Aug. 21, 2012

(54) POLYMER SUPPORTED CHROME CATALYST FOR OLEFINS POLYMERIZATION

(76) Inventor: Abdullah Saad N. Al-Arifi, Riyadh (SA)

( * ) Notice: Subject to any disclaimer, the term of this patent is extended or adjusted under 35 U.S.C. 154(b) by 374 days.

(21) Appl. No.: 12/177,979

(22) Filed: Jul. 23, 2008

(65) Prior Publication Data

US 2010/0022727 A1 Jan. 28, 2010

(51) Int. Cl.
*C08F 4/44* (2006.01)

(52) U.S. Cl. ........ 502/117; 526/160; 526/352; 526/114; 526/78; 526/79; 526/119; 526/348.6; 526/348.2; 526/348.5; 526/901; 526/905; 502/152

(58) Field of Classification Search ........ 526/90, 526/160, 114, 78, 79, 119, 348.6, 348.5, 526/348.2, 901, 905; 502/117, 152
See application file for complete search history.

(56) References Cited

U.S. PATENT DOCUMENTS

| | | | |
|---|---|---|---|
| 3,445,367 A | 5/1969 | Kallenbach | |
| 3,622,521 A | 11/1971 | Hogan et al. | |
| 3,879,362 A | 4/1975 | Chalfont et al. | |
| 3,950,316 A | 4/1976 | Witt | |
| 3,974,101 A | 8/1976 | Witt | |
| 3,985,676 A | 10/1976 | Rekers et al. | |
| 4,049,896 A | 9/1977 | Rekers et al. | |
| 4,451,573 A * | 5/1984 | Ikegami et al. | 526/114 |
| 6,372,868 B1 * | 4/2002 | Szul et al. | 526/114 |
| 2005/0148744 A1 * | 7/2005 | Kao | 526/114 |

* cited by examiner

*Primary Examiner* — Robert D. Harlan
(74) *Attorney, Agent, or Firm* — Abelman, Frayne & Schwab

(57) ABSTRACT

A highly active supported chromium catalyst composition for ethylene and other olefins polymerization and also for ethylene copolymerization with efficient incorporation of comonomer, produces polymers with superior spherical morphology, improved bulk density and almost 0% fines. The catalyst composition component includes at least one chromium compound, mainly chromium acetylacetonate, or chromium hexaflouroacetonylacetonate, or chromium diethylmalonate. One magnesium compound, or aluminum compound, metal alkoxy compound and defined polymer particles mainly chloromethylated cross linked styrene-DVB copolymer or polyvinylchloride. The catalyst composition, when used in conjunction with an organoaluminum compound or a mixture of organoaluminum compounds, can be used for olefin polymerization to produce medium or high density polyethylene and copolymers of ethylene with alpha-olefins having about 3 to 18 carbon atoms.

14 Claims, 2 Drawing Sheets

US 8,247,342 B2

POLYMER SUPPORTED CHROME CATALYST FOR OLEFINS POLYMERIZATION

BACKGROUND OF THE INVENTION

1. Field of the Invention

This invention relates to a polymer supported chromium catalyst composition used for olefin polymerization, novel methods of producing such catalysts and methods of polymerizing and copolymerizing alpha-olefins to produce high density polyethylene polymers with high melt indices and superior morphology. This invention relates to the preparation of new catalyst formulation comprising of a chromium compound, a magnesium containing compound or an aluminum compound a metal alkoxy compound and a polymeric material support, mainly chloromethylated cross linked styrene-DVB copolymer or polyvinylchloride.

2. Description of the Related Art

The basic chromium oxide catalyst was discovered by J. P. Hogan and R. L. Banks at Phillips Petroleum. The catalyst, along with associated solution and slurry processes, was licensed worldwide and this catalyst composition still accounts for a large fraction of the high density polyethylene produced today. Phillips has continued to be active in research to improve through out the years and modified their basic catalyst, as described in U.S. Pat. Nos. 3,445,367, 3,622,521, 3,879,362, 3,950,316, 3,985,676, 3,974,101, and 4,049,896.

Many of the Phillips licensees have also followed the same pattern, and that can be seen from the volume of their patents, pursued active programs in this area. The catalyst has been further studied in a number of academic laboratories with the objective of understanding the chemistry of the active site and of the polymerization.

These catalysts consisted of a chromium (VI) oxide supported on a high surface refractory oxide support. Generally the support is amorphous microspheroidal silica. The catalyst is prepared by activating the chromium containing support at temperatures of 500° C. to 1000° C. in a dry, oxygen containing atmosphere. Modifying materials such as titanium and fluoride are generally added prior to the activation.

A large number of chromium compounds can be used in the preparation of these catalyst, all are presumably converted to Cr(VI) oxide under these activation conditions. Chromium (VI) oxide ($CrO_3$) is itself unstable at temperatures above 350° C. and decomposes to chromium (III) oxide ($Cr_2O_3$) and oxygen. This leads to the conclusion that Cr (VI) species in the catalyst after activation is not a simple $Cr_2O_3$, but the product of an interaction of the chromium (III) oxide with the support surface. One such proposed product is a surface chromate ester.

Also, despite the extensive use of the described supports for olefin polymerization catalysts, the support materials themselves have several deficiencies. For example, in the case of chromate silica high calcinations temperatures in the range 500° C. to 1000° C. are required for the following: (1) oxidizing all Cr species present to Cr (VI) species, (2) removals of all organic & volatile materials, (3) removals of most chemically bound water from the silica surface, (4) completing ionic association of chromium and modifiers with silica.

This represents a significant portion of the preparation time of the catalyst. Further, silica supported this way is typically done by contacting silica with chromium compound prior to the deposition of the titanium component.

This procedure is usually troublesome. Also, the use of silica as a support results in the support remaining largely in the product, which can affect the product properties, such as optical properties, or processing.

BRIEF SUMMARY OF THE INVENTION

One of the objectives of the catalyst described in the present invention is to overcome the difficulties encountered in the prior art development to produce polymers with superior morphology, fines free and good bulk densities making it suitable especially for Gas phase process technology which favors higher bulk density polymer to maintain higher productivity.

In the present invention no high temperature calcinations between 500° C. to 900° C. required to activate the chromium in the catalyst, in fact the whole catalyst preparation is performed in a slurry solution of no more than 70° C. Accordingly, the preparation is conducted by simple drying of the polymer support at normal temperatures of no more than 100° C., then the sequential addition of the catalyst compositions.

The present invention provides highly active supported chromium catalyst composition for ethylene and other olefins polymerization and also for ethylene copolymerization with efficient incorporation of comonomer. This catalyst produces polymers with superior spherical morphology, improved bulk density and almost 0% fines.

This catalyst composition component comprises of at least one chromium compound, mainly chromium acetylacetonate, or chromium hexaflouroacetonylacetonate, or chromium diethylmalonate. One magnesium compound, or aluminum compound, metal alkoxy compound and defined polymer particles mainly chloromethylated cross linked styrene-DVB copolymer or polyvinylchloride. The polymer particles used in catalyst preparation have a mean particle diameter of 5 μm to 200 μm and a pore volume of at least 0.05 $cm^3/g$ and a pore diameter of at least from 50 Angstroms to 200 Angstroms, preferably from 100 Angstroms to 200 Angstroms and a surface area of from 0.1 $m^2/g$ to 5 $m^2/g$, preferably from 0.2 $m^2/g$ to 3 $m^2/g$.

The catalyst composition, when used in conjunction with an organoaluminum compound or a mixture of organoaluminum compounds, can be used for olefin polymerization to produce medium or high density polyethylene and copolymers of ethylene with alpha-olefins having about 3 to 18 carbon atoms.

BRIEF DESCRIPTION OF THE SEVERAL VIEWS OF THE DRAWINGS

Preferred embodiments of the invention are disclosed hereinbelow with reference to the drawings.

DETAILED DESCRIPTION OF THE INVENTION

Figure 1:
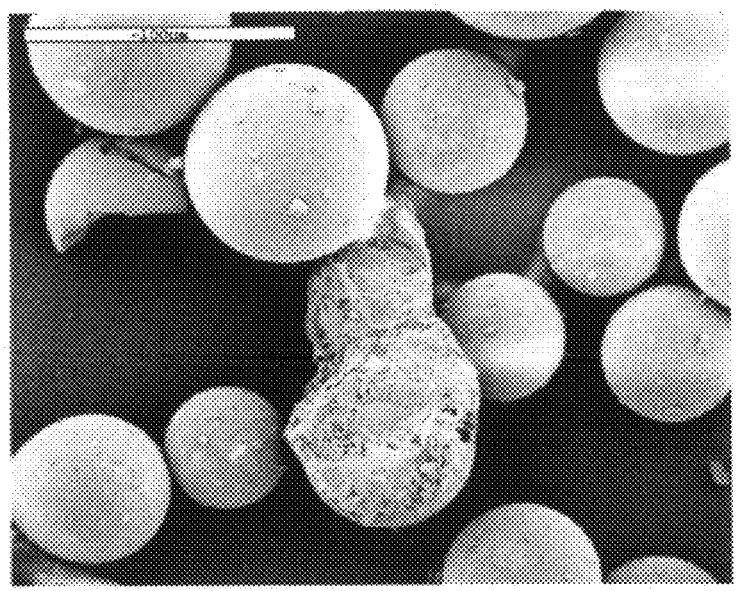
FIG. 1 is a general view of the chloromethylated cross linked styrene-DVB copolymer support, showing perfect spherical morphology.
Figure 2:
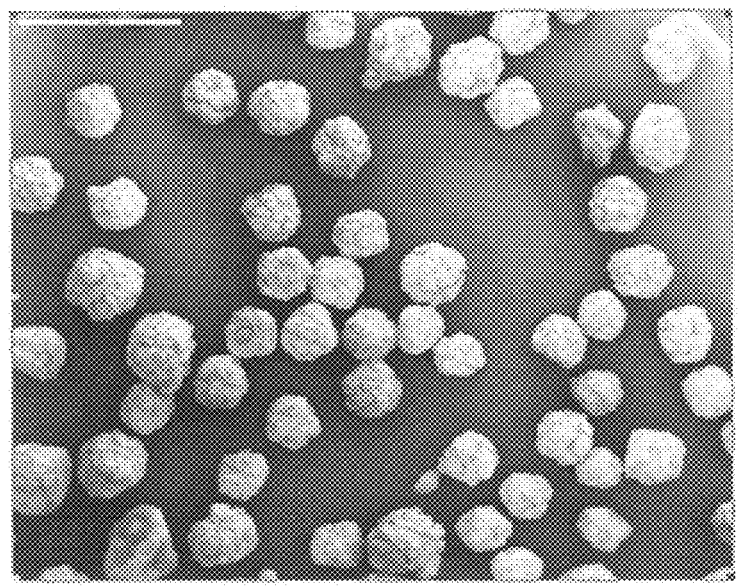
FIG. 2 is a general view of the of the produced polyethylene polymer, showing superior spherical morphology, narrow particle size distribution and no fines.
Figure 3:
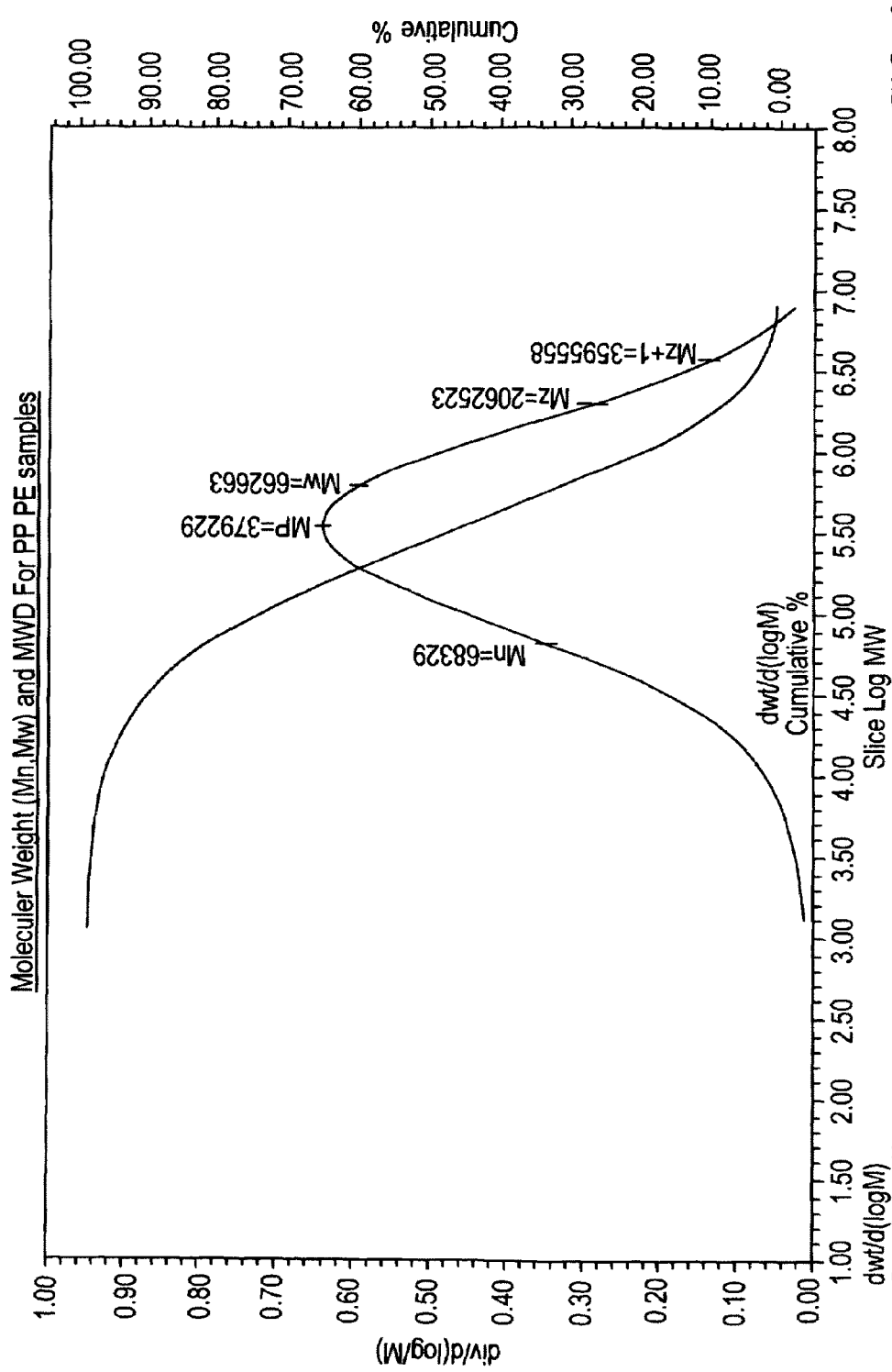
FIG. 3 is a GPC profile of the HDPE resin produced by the polymer supported chromium catalyst.

As shown in FIGS. 1-3, the solid catalyst composition (catalyst precursor) used in the present invention contains at least one chromium compound, one magnesium compound or an aluminum compound, one metal alkoxy compound and a polymeric material support having a mean particle diameter of 5 μm to 200 μm and a pore volume of at least 0.05 $cm^3/g$ and a pore diameter of at least from 50 Angstroms to 250 Angstroms, preferably from 100 Angstroms to 200 Angstroms and a surface area of from 0.1 m$^2$/g to 5 m$^2$/g, preferably from 0.2 m$^2$/g to 3 m$^2$/g.

At least one chromium compound is used for the preparation of the catalyst in the present invention. The chromium used can be represented by the general formula Cr(R$^1$COCHCOR$^2$)$_3$. where are R$^1$=H, alkyl or aryl group or any hydrocarbon which contains 1 to 20 carbon atoms all of which can be halogenated compounds also it could be an alkoxy or aryloxy group or any hydrocarbon which contains 1 to 20 carbon atoms, and R$^2$=H, alkyl or aryl group or any hydrocarbon which contains 1 to 20 carbon atoms all of which can be halogenated compounds also it could be an alkoxy or aryloxy group or any hydrocarbon which contains 1 to 20 carbon atoms.

Preferable examples of the above mentioned chromium compounds include the following: chromium (III) acetylacetonate, chromium (III) hexafloro acetylacetonate and chromium (III) diethyl malonate.

The metal alkoxy compound used for the catalyst synthesis in this invention can be represented in the general formula M(OR)$_n$, in which M can be any metal, more preferably a transition metal like titanium, zirconium, vanadium, hafnium, etc.; R is an alkyl group or any hydrocarbon which contains 1 to 20 carbon atoms; and n is the number of the alkoxy groups depends on the oxidation number of the used metal.

The metal alkoxy compound can be also represented in the general formula M(OR)$_a$X$_b$ wherein R represents a hydrocarbon residue having 1 to 20 carbon atoms, M is a metal more preferably a transition metal, X represent a halogen atom and a and b represent number satisfying (1≦a≦4), (0≦b≦3) and (a+b=4) in the case of a tetra valance metal, and n represent the number of alkoxy groups according to the oxidation state of the used metal.

Preferable examples of the above mentioned metal alkoxy compounds include the following; tetraethoxy titanium, tetramethoxy titanium, tetrabutoxy titanium, tetrapropoxy titanium, tetraisobutoxy titanium, terapentoxy titanium, triethoxychloro titanium, diethoxydichloro titanium, trichloethoxy titanium, etc. Similarly these compounds can include other metals e.g., zirconium, vanadium, hafnium etc.

The magnesium compound used for the catalyst synthesis in the invention include Grignard compounds represented by the general formula R$^1$MgX, wherein R$^1$ is a hydrocarbon group of 1 to 20 carbon atoms and X is a halogen atom, preferably chlorine. Other preferable magnesium compounds are represented by the general formula R$^2$MgR$^3$, in which R$^2$ and R$^3$ are each a hydrocarbon group of 1 to 20 carbon atoms.

Preferable examples of the above mentioned magnesium compounds include the following; dialkylmagnesium such as diethylmagnesium, dipropylmagnesium, diisoproylmagnesium, dinbutylmagnesium, diisobutylmagnesium butylethylmagnesium, dihexylmagnesium, dioctylmagnesium; alkyl magnesium chloride such as ethylmagnesium chloride, butylmagnesium chloride, hexylmagnesium chloride and the like.

The catalyst in the present invention suitably synthesized with an aluminoxane represented by the general formula R$^5$R$^6$Al—O—AlR$^7$R$^8$, where R$^5$, R$^6$, R$^7$, and R$^8$ are either same or different linear, branched or cyclic alkyl group of 1 to 12 carbons; such as methyl, ethyl, propyl or isobutyl. The preferred examples are methylaluminoxane and modified methylaluminoxane (MMAO) or a mixture of aluminum alkyls and MAO.

The polymer particles used in the present invention are in the form of distinct spherical particles, on which the active catalyst composition is chemically bonded, wherein the ratio of active catalyst composition to polymeric support is less than 2% by weight.

The polymer particles used in the present invention have a perfect spherical shape with a mean particle diameter of 5 μm to 200 μm, a pore volume of at least 0.05 cm$^3$/g, a pore diameter of at least from 50 Angstroms to 250 Angstroms, preferably from 100 Angstroms to 200 Angstroms and a surface area of from 0.1 m$^2$/g to 5 m$^2$/g, preferably from 0.2 m$^2$/g to 3 m$^2$/g.

Examples of the polymeric supports used in the catalyst preparation of the present invention include thermoplastic polymers. Mainly the polymer particles of chloromethylated cross linked styrene-DVB copolymer and PVC are of the most preferred embodiments.

The polymer particles used in the present invention have surface active sites such as labile chlorine atoms. Preferably, these active sites are reacted stoichiometrically with the organometallic compound, namely a magnesium containing compound.

The use of the polymer particles mentioned in this invention which is used in catalyst preparation offers significant advantages over traditional olefin polymerization catalysts using supports such as silica or magnesium chloride. In comparison to the silica supported catalyst, the polymer particles described in catalyst preparation of the invention require no high temperature and prolonged dehydration steps prior to their use in catalyst synthesis, thereby simplifying the synthesis process and thus reducing the overall cost of catalyst preparation. In addition, unlike silica supported metallocene catalysts preparation, the present invention does not require a big amount of organoaluminum compounds in the preparation of the catalyst.

According to most of the embodiments, chloromethylated cross linked styrene-DVB copolymer support is used. The synthesis of the solid catalyst composition in the present invention involves introducing the polymeric material described above into a vessel and then adding a diluent. Suitable diluents include isopentane, hexane, cyclohexane, heptane, isooctane and pentamethylheptane or ethers such as diethylether, methyltertiarybutylether, dibutylether, toluene, etc. The polymeric material is then treated with a magnesium compound described above at a temperature in the range of about 20° C. to 110° C. The ratio of magnesium compound to the polymer support can be in the range of 0.05 mmol to 20 mmol per gram polymer, preferably, 0.1 mmol to 10 mmol per gram polymer, and more preferably 0.2 mmol to 2 mmol per gram polymer. This is usually followed by the addition of the metal alkoxy compound most preferably tetraethoxy titanium in he range of 0.01 mmol to 0.09 mmol per gram polymer. Again the treatment is done in this stage at a temperature of about 20° C. to 110° C. for at least half an hour.

Then a suitable amount of chromium compound is added to the reaction mixture in the range of 0.01 mmol to 0.09 mmol per gram polymer and left agitating for about one hour without changing the reaction temperature. The solvent then is removed by filtration and the remaining of solvent ere vaporized using a nitrogen purge at a temperature in the range of about 20° C. to 80° C.

Optionally the catalyst can be preactivated with an aluminum alkyl compound most preferably a aluminoxane compound, the preferred examples are methylaluminoxane and modified methylaluminoxane (MMAO, Type 3A, 7% Al in n-heptane from Akzo-Nobel) or a mixture of aluminum alkyls and standard MAO in toluene.

The ratio of Aluminoxane compound to the support is usually ranging between 0.1 ml to 0.7 ml of 10% aluminxane to give no more than 2% of Al loading in the final catalyst.

The solid catalyst composition is then dried using a nitrogen purge at a temperature in the range of 20° C. to 100° C., preferably 30° C. to 80° C. or vacuum.

The catalyst composition of this invention is not subjected to halogenation, e.g., chlorination treatments. The thus-formed catalyst composition is activated with suitable activators, also known as co-catalysts or catalyst promoters for olefin polymerization. The preferred compounds for activation of the solid catalyst composition are organoaluminum compounds.

The catalyst can be suitably activated by organoaluminum compounds represented by the general formula $R^4{}_n AlX_{3-n}$, in which $R^4$ represents a hydrocarbon group having 1 to 10 carbon atoms, X represents a halogen atom or an alkoxy group, and n represents a number satisfying $0 \leq n \leq 3$.

Illustrative but not limiting examples include trialkylaluminums such as trimethylaluminum, triethylaluminum, triisobutylaluminum, trinhexylaluminum; dialkylaluminum chloride such as dimethylaluminum chloride, diethylaluminum chloride; alkylaluminum dichloride such as methylaluminum dichloride, ethylaluminum dichloride; dialkylaluminum methoxide such as dimethylaluminum methoxide, diethylaluminum ethoxide. The preferred activators of the above general formula are trimethylaluminum, triethylaluminum, triisobutylaluminum and trinhexylaluminum. The catalyst in the present invention may also be suitably activated with an aluminoxane represented by the general formula $R^5 R^6 Al$—O—$AlR^7 R^8$, where $R^5$, $R^6$, $R^7$ and $R^8$ are either the same or different linear, branched or cyclic alkyl group of 1 to 12 carbons; such as methyl, ethyl, propyl or isobutyl. The preferred examples are methylaluminoxane and modified methylaluminoxane (MMAO).

Mixtures of alkylaluminum compounds and aluminoxanes compounds described above can also be conveniently used for catalyst activation. The alkylaluminum compound or aluminoxane compounds in this invention can be used in the range of about 1 mole to 3000 moles of aluminum per one mole of transition metal in the said catalyst, and more preferably in the range of about 50 moles to 1500 moles per one mole of transition metal.

The catalyst composition described in the present invention can operate in polymerizing alpha-olefins in slurry and gas phase processes. Gas phase polymerization can be carried out in stirred bed reactors and in fluidized bed reactors. A pressure in the range of 5 bars to 40 bars is suitable for the polymerization, preferably 10 bars to 35 bars. Suitable polymerization temperatures are in the range of 30° C. to 110° C., preferably 50° C. to 95° C. In addition to polyethylene homopolymer, ethylene copolymers with $C_3$-$C_{10}$ alpha-olefins are readily prepared by the present invention.

Particular examples include ethylene/propylene, ethylene/1-hexene, ethylene/1-butene, ethylene/1-octene and ethylene/4-methyl-1-pentene.

EXAMPLES

The following examples are intended to be illustrative of this invention. They are, of course, not to be taken in any way limiting on the scope of this invention. Numerous changes and modifications can be made with respect to the invention.

Example 1

Synthesis of Catalyst A

Two grams of the polymeric support chloromethylated cross linked styrene-DVB copolymer (spheres of 50 µm average particle sizes) were placed in the catalyst preparation vessel (CPV) which consists of three-necked round bottom flask, fitted with a filter which connected with a side tube ending up with a Rota tap, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm³ of dry toluene at 40° C. Then 4 mmol of butylmagnesium chloride (supplied by Aldrich, 2.0 molar in diethyl ether) was added to the slurry and the resultant mixture was stirred for 15 minutes at 40° C. After which 0.3 mmol of tetraethoxy titanium was added to the mixture and left mixing for 30 minutes at 40° C. Then 0.3 g of Cr(III) acetylacetonate in 10 cm⁻³ toluene was added to the mixture and left mixing for 60 minutes at 60° C. The solvent then was removed by filtration and the remaining solvent was evaporated using a nitrogen purge at 80° C. Followed by three time washing using toluene after which the catalyst was dried at 80° C. to yield a free-flowing solid catalyst.

The elements analysis of the solid catalyst showed that the catalyst contain 1.3 wt. % of titanium, 1.2 wt. % of magnesium and 0.38 wt. % of chromium.

Example 2

Ethylene Hompolymerization

Two liters autoclave was purged with nitrogen at 130° C. for 30 minutes. The autoclave was cooled to 80° C. under a flow of nitrogen and one liter of n-hexane was introduced to the autoclave. The autoclave was charged with 0.2 bar of hydrogen and 13.8 bar of ethylene. Then 3.5 mmol of TEA solution was injected into the autoclave by means of a catalyst injection pump, was followed by injection of 0.065 g of the solid catalyst A described in Example 1 after being slurried in 20 cm³ of n-hexane. The autoclave temperature was raised up to 95° C. and ethylene polymerization was carried out for 60 minutes while ethylene supplied on demand to maintain the total autoclave pressure at 15 bars. The polymerization process consumed 253 liters of ethylene and produced 261 grams of polyethylene. Thus the catalyst activity was 10567 g PE/g Cr h at 13 bars, and a catalyst productivity of 4015 g PE/kg cat h.

GPC of the produced polyethylene showed that an average molecular weight of 662663 and a number average molecular weight of 68329. The molecular weight distribution of the produced polyethylene was narrow with the value of 9.7. The produced polyethylene has 0.34 g/cm³ as a bulk density.

Example 3

Synthesis of Catalyst B

Two grams of the polymeric support chloromethylated cross linked styrene-DVB copolymer (spheres of 50 µm average particle sizes) were placed in the catalyst preparation vessel (CPV) which consists of three-necked round bottom flask, where is he bottom of the vessel fitted with a filter which connected with a side tube ending up with a Rota tab, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm³ of dry toluene at 40° C. Then 4 mmol of butylmagnesium chloride (supplied by Aldrich, 2.0 molar in diethyl ether) was added to the slurry and the resultant mixture was stirred for 15 minutes at 40° C. After which 0.3 mmol of tetraethoxy titanium was added to the mixture and left mixing for 30 minutes at 40° C. Then 0.4 g of Cr(III) hexafluro acetylacetonate in 10 cm$^{-3}$ toluene was added to the mixture and left mixing for 60 minutes at 60° C. The solvent then is removed by filtration and the remaining of solvent are vaporized using a nitrogen purge at 80° C. Followed by three time washing using toluene after which the catalyst was dried at 80° C. to yield a free-flowing solid catalyst.

Example 4

Ethylene Hompolymerization

One liters autoclave was purged with nitrogen at 130° C. for 30 minutes. The autoclave was cooled to 80° C. under a flow of nitrogen and one liter of n-hexane was introduced to the autoclave. The autoclave was charged with 7 bar of ethylene. Then 3 mmol of TMA solution was injected into the autoclave by means of a catalyst injection pump, was followed by injection of 0.07 g of the solid catalyst B described in Example 3 after being slurried in 20 cm$^3$ of n-hexane. The autoclave temperature was raised up to 90° C. and ethylene polymerization was carried out for 60 minutes while ethylene supplied on demand to maintain the total autoclave pressure at 7 bars. The polymerization process produced 60 grams of polyethylene. Thus the catalyst productivity is 857 g PE/g cat h.

Example 5

Synthesis of Catalyst C

Two grams of the polymeric support chloromethylated cross linked styrene-DVB copolymer (spheres of 50 μm average particle sizes) were placed in the catalyst preparation vessel (CPV) which consists of three-necked round bottom flask, where is he bottom of the vessel fitted with a filter which connected with a side tube ending up with a Rota tab, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm$^3$ of dry toluene at 40° C. Then 4 mmol of butylmagnesium chloride (supplied by Aldrich, 2.0 molar in diethyl ether) was added to the slurry and the resultant mixture was stirred for 15 minutes at 40° C.

After which 0.3 mmol of tetraethoxy titanium was added to the mixture and left mixing for 30 minutes at 40° C. Then 0.35 g of Cr(III) diethyl malonate in 10 cm$^{-3}$ toluene was added to the mixture and left mixing for 60 minutes at 60° C. The solvent then is removed by filtration and the remaining of solvent are vaporized using a nitrogen purge at 80° C. Followed by three time washing using toluene after which the catalyst was dried at 80° C. to yield a free-flowing solid catalyst.

Example 6

Ethylene Hompolymerization

One liter autoclave was purged with nitrogen at 130° C. for 30 minutes. The autoclave was cooled to 80° C. under a flow of nitrogen and one liter of n-hexane was introduced to the autoclave. The autoclave was charged with 7 bar of ethylene.

Then 4 mmol of TEA solution was injected into the autoclave by means of a catalyst injection pump, was followed by injection of 0.07 g of the solid catalyst C described in Example 5 after being slurried in 20 cm$^3$ of n-hexane. The autoclave temperature was raised up to 90° C. and ethylene polymerization was carried out for 60 minutes while ethylene supplied on demand to maintain the total autoclave pressure at 7 bars. The polymerization process produced 90 grams of polyethylene. Thus the catalyst productivity is 1286 g PE/g cat h.

Example 7

Synthesis of Catalyst D

Two grams of the polymeric support chloromethylated cross linked styrene-DVB copolymer (spheres of 50 μm average particle sizes) were placed in the catalyst preparation vessel (CPV) which consists of three-necked round bottom flask, where is he bottom of the vessel fitted with a filter which connected with a side tube ending up with a Rota tab, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm$^3$ of dry toluene at 40° C. Then 4 mmol of butylmagnesium chloride (supplied by Aldrich, 2.0 molar in diethyl ether) was added to the slurry and the resultant mixture was stirred for 15 minutes at 40° C. After which 0.3 mmol of tetraethoxy titanium was added to the mixture and left mixing for 30 minutes at 40° C. Then 0.15 g of Cr(III) diethyl malonate and 0.15 g of Cr(III) acetylacetonate in 10 cm$^{-3}$ toluene was added to the mixture and left mixing for 60 minutes at 60° C. The solvent then is removed by filtration and the remaining of solvent are vaporized using a nitrogen purge at 80° C. Followed by three time washing using toluene after which the catalyst was dried at 80° C. to yield a free-flowing solid catalyst.

Example 8

Ethylene Hompolymerization

One liter autoclave was purged with nitrogen at 130° C. for 30 minutes. The autoclave was cooled to 80° C. under a flow of nitrogen and one liter of n-hexane was introduced to the autoclave. The autoclave was charged with 7 bar of ethylene. Then 4 mmol of TEA solution was injected into the autoclave by means of a catalyst injection pump, was followed by injection of 0.07 g of the solid catalyst D described in Example 7 after being slurried in 20 cm$^3$ of n-hexane. The autoclave temperature was raised up to 90° C. and ethylene polymerization was carried out for 60 minutes while ethylene supplied on demand to maintain the total autoclave pressure at 7 bars. The polymerization process produced 60 grams of polyethylene. Thus the catalyst productivity is 857 g PE/g cat h.

Example 9

Synthesis of Catalyst E

Two grams of the polymeric support chloromethylated cross linked styrene-DVB copolymer (spheres of 50 μm average particle sizes) were placed in the catalyst preparation vessel (CPV) which consists of three-necked round bottom flask, where is he bottom of the vessel fitted with a filter which connected with a side tube ending up with a Rota tab, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm$^3$ of dry toluene at 40° C. Then 4 mmol of diethyl aluminum chloride (supplied by Aldrich, 2.0 molar in diethyl ether) was added to the slurry and the resultant mixture was stirred for 15 minutes at 40° C.

After which 0.3 mmol of tetraethoxy titanium was added to the mixture and left mixing for 30 minutes at 40° C. Then 0.3 g of Cr(III) acetylacetonate in 10 cm$^{-3}$ toluene was added to the mixture and left mixing for 60 minutes at 60° C. The solvent then is removed by filtration and the remaining of solvent are vaporized using a nitrogen purge at 80° C. Followed by three time washing using toluene after which the catalyst was dried at 80° C. to yield a free-flowing solid catalyst.

The elements analysis of the solid catalyst showed that the catalyst contain 0.85 wt. % of titanium, 1.53 wt. % of aluminum and 2.27 wt. % of chromium.

Example 10

Ethylene Hompolymerization

One liter autoclave was purged with nitrogen at 130° C. for 30 minutes. The autoclave was cooled to 80° C. under a flow of nitrogen and one liter of n-hexane was introduced to the autoclave. The autoclave was charged with 7 bar of ethylene. Then 2.5 mmol of TMA solution and 1.5 cm$^3$ of modified methylaluminoxane (MMAO, Type 3A, 7% Al in n-heptane from Akzo-Nobel) was injected into the autoclave by means of a catalyst injection pump, was followed by injection of 0.07 g of the solid catalyst E described in Example 9 after being slurried in 20 cm$^3$ of n-hexane. The autoclave temperature was raised up to 90° C. and ethylene polymerization was carried out for 60 minutes while ethylene supplied on demand to maintain the total autoclave pressure at 7 bars. The polymerization process produced 25 grams of polyethylene. Thus the catalyst productivity is 357 g PE/g cat h.

Example 11

Synthesis of Catalyst F

Two grams of the polymeric support chloromethylated cross linked styrene-DVB copolymer (spheres of 50 µm average particle sizes) were placed in the catalyst preparation vessel (CPV) which consists of three-necked round bottom flask, where is he bottom of the vessel fitted with a filter which connected with a side tube ending up with a Rota tab, also the (CPV) equipped with a condenser and stirrer. The (CPV) containing the polymeric support was evacuated down to 30 mm Hg pressure for 30 minutes while stirring at 110° C. The (CPV) and its contents were then purged with dried nitrogen and the polymeric support was slurried using 30 cm$^3$ of dry toluene at 40° C. Then 4 mmol of butylmagnesium chloride (supplied by Aldrich, 2.0 molar in diethylether) was added to the slurry and the resultant mixture was stirred for 15 minutes at 40° C. After which a solution of (2 cm$^3$ of MMAO type 3A, 7% Al from Akzo-Nobel in 20 cm$^3$ of n-hexane) was added to the mixture and left mixing for 30 minutes at 40° C. Then 0.3 g of Cr(III) acetylacetonate in 10 cm$^{-3}$ toluene was added to the mixture and left mixing for 60 minutes at 60° C. The solvent then is removed by filtration and the remaining of solvent are vaporized using a nitrogen purge at 80° C. Followed by three time washing using toluene after which the catalyst was dried at 80° C. to yield a free-flowing solid catalyst.

Example 12

Ethylene Hompolymerization

One liter autoclave was purged with nitrogen at 130° C. for 30 minutes. The autoclave was cooled to 80° C. under a flow of nitrogen and one liter of n-hexane was introduced to the autoclave. The autoclave was charged with 7 bar of ethylene. Then 2.5 mmol of TMA solution and 1.5 cm$^3$ of modified methylaluminoxane (MMAO, Type 3A, 7% Al in n-heptane from Akzo-Nobel) was injected into the autoclave by means of a catalyst injection pump, was followed by injection of 0.07 g of the solid catalyst F described in Example 11 after being slurried in 20 cm$^3$ of n-hexane. The autoclave temperature was raised up to 90° C. and ethylene polymerization was carried out for 60 minutes while ethylene supplied on demand to maintain the total autoclave pressure at 7 bars. The polymerization process produced 7 grams of polyethylene. Thus the catalyst productivity is 100 g PE/g cat h.

What is claimed is:

1. A catalyst composition for polymerizing of olefins comprising:
   a solid catalyst precursor consisting essentially of at least one chromium compound, at least one magnesium compound, at least one metal alkoxy compound, a polymeric material support, and an optional aluminum compound; and
   a co-catalyst comprising at least one aluminum compound.

2. The catalyst composition of claim 1, wherein the chromium compound is represented by the general formula Cr (III) $(R^1COCHCOR^2)_3$, wherein $R^1$ and $R^2$ are alkyl groups or any hydrocarbon which contains 1 to 20 carbon atoms.

3. The catalyst composition of claim 2, wherein the chromium compound is chromium acetylacetonate, chromium hexaflouroacetonyl acetonate, or chromium diethylmalonate.

4. The catalyst composition of claim 1, wherein the polymeric support is composed of particles having a mean particle diameter of 5 µm to 200 µm, a pore volume of at least 0.05 ml/g up to 0.1 ml/g, a surface area from 0.1 m$^2$/g, and a pore diameter of at least from 90 Angstroms to 300 Angstroms.

5. The catalyst composition of claim 4, wherein the particles are chloromethylated cross linked styrene-DVB copolymer or polyvinylchloride.

6. The catalyst composition of claim 1, wherein the magnesium compound is a reagent with a chemical formula $R_aMgX_{2-a}$ wherein R is a hydrocarbyl group having 1 to 20 carbon atom and X is a halogen or an alkyl group and $0 \leq a \leq 2$.

7. The catalyst composition of claim 5, wherein the magnesium compound is diethylmagnesium, dibutylmagnesium, butylethylmagnesium, dihexylmagnesium, butyloctyl magnesium, ethylmagnesium chloride, butylmagnesium chloride, hexylmagnesium chloride or mixtures thereof.

8. The catalyst composition of claim 1, wherein the metal alkoxy compound is a reagent with a formula $M(OR)_n$, in which M is a transition metal selected from the group titanium, vanadium, zirconium, and hafnium; O is oxygen; R is an alkyl group or any hydrocarbon branched or non-branched which contains 1 to 20 carbon atoms; and n is the number of the alkoxy groups depending on the oxidation number of the transition metal used.

9. The catalyst composition of claim 8, wherein the metal alkoxy compound is tetraethoxy titanium, tetrabutoxy titanium, or tetraethoxy zirconium.

10. The catalyst composition of claim 1, wherein the aluminum is an aluminoxane compound represented in the general formula $R^5R^6Al\text{---}O\text{---}AlR^7R^8$ where $R^5$, $R^6$, $R^7$ and $R^8$ each represent a hydrocarbyl group having 1 to 10 carbon atoms or/and can be represented in the general formulas $R^4{}_nAlX_{3-n}$ each represent a hydrocarbyl group having 1 to 10 carbon atoms, X represents a halogen atom, and n represents a number satisfying $0 \leq n \leq 3$.

11. The catalyst composition in claim 1, wherein the alpha-olefins are propylene, 1-butene, 1-pentene, 1-hexene, 1-heptene or 1-octene or mixtures thereof.

12. A polymer product produced by the catalyst composition of claim 1, wherein the polymer is a high density polyethylene with a broad molecular weight distribution ranging between 6 to 15 Mw/Mn.

13. The catalyst composition in claim 1, wherein said solid catalyst precursor further includes an aluminum compound.

14. The catalyst composition of claim 13, wherein the aluminum compound is trialkylaluminum, alkyl aluminum chloride, and/or (MAO) methylaluminum.

* * * * *